United States Patent
Hunter et al.

(10) Patent No.: US 9,820,017 B2
(45) Date of Patent: Nov. 14, 2017

(54) SUBSEA CONNECTOR WITH DATA COLLECTION AND COMMUNICATION SYSTEM AND METHOD

(71) Applicant: Teledyne Instruments, Inc., Thousand Oaks, CA (US)

(72) Inventors: John B. Hunter, Baskin Ridge, NJ (US); Huijiang Xi, Maitland, FL (US); Michael C. Greene, Palm Bay, FL (US)

(73) Assignee: TELEDYNE INSTRUMENTS, INC., Thousand Oaks, CA (US)

( * ) Notice: Subject to any disclaimer, the term of this patent is extended or adjusted under 35 U.S.C. 154(b) by 599 days.

(21) Appl. No.: 14/453,504

(22) Filed: Aug. 6, 2014

(65) Prior Publication Data

US 2016/0044390 A1     Feb. 11, 2016

(51) Int. Cl.
*H04Q 9/00*     (2006.01)
*E21B 33/038*   (2006.01)
(Continued)

(52) U.S. Cl.
CPC .............. *H04Q 9/00* (2013.01); *E21B 33/038* (2013.01); *G02B 6/3816* (2013.01);
(Continued)

(58) Field of Classification Search
CPC ...................................................... H04Q 9/00
See application file for complete search history.

(56) References Cited

U.S. PATENT DOCUMENTS

| 5,171,158 A | 12/1992 | Cairns |
| 5,645,442 A | 7/1997 | Cairns |

(Continued)

FOREIGN PATENT DOCUMENTS

| EP | 0332622 A1 | 9/1989 |
| WO | 2013177685 A1 | 12/2013 |

OTHER PUBLICATIONS

International Search Report and Written Opinion for related international application No. PCT/US2015/041007 dated Oct. 26, 2015 in 10 pages.

*Primary Examiner* — Joseph Feild
*Assistant Examiner* — Pameshanand Mahase
(74) *Attorney, Agent, or Firm* — Procopio, Cory, Hargreaves & Savitch, LLP

(57) ABSTRACT

A subsea data collection and communication system is installed at a subsea interconnect point or subsea connector used for communication between subsea electrical, optical or hybrid electro-optical cables. The data collection and communication system is configured to collect system performance data such as voltage, current, optical pressure and the like from signals carried by the wires or fibers in cables connected to the connector unit, and may also collect data on environmental conditions from sensors installed in or on the connector unit, such as temperature, pressure, or sea water salinity sensors, and the like. The collected data is transmitted to a remote monitoring station or local hub for further processing to detect potential faults or performance degradation either at periodic intervals or on demand, using bi-directional Ethernet, CANBUS, a carrier frequency system over the cable power lines, optical signal over optical fiber, or wireless communication links over short distances.

16 Claims, 9 Drawing Sheets

(51) Int. Cl.
  *G06Q 20/32* (2012.01)
  *G02B 6/38* (2006.01)
  *G02B 6/42* (2006.01)
  *G02B 6/44* (2006.01)
  *G02B 6/50* (2006.01)

(52) U.S. Cl.
  CPC .......... *G02B 6/3817* (2013.01); *G02B 6/4292* (2013.01); *G02B 6/4448* (2013.01); *G02B 6/508* (2013.01)

(56) References Cited

U.S. PATENT DOCUMENTS

| | | | |
|---|---|---|---|
| 6,017,227 A | 1/2000 | Cairns et al. | |
| 6,315,461 B1 | 11/2001 | Cairns | |
| 6,332,787 B1 | 12/2001 | Barlow et al. | |
| 2005/0213649 A1* | 9/2005 | Green | H04B 13/02 375/222 |
| 2009/0204310 A1* | 8/2009 | Gittere | G07C 5/008 701/102 |
| 2010/0089943 A1* | 4/2010 | Till | B67D 1/0884 222/1 |
| 2010/0202463 A1* | 8/2010 | Robinson | H04L 12/4616 370/400 |
| 2011/0130024 A1 | 6/2011 | Cairns | |
| 2011/0280538 A1* | 11/2011 | Durrant | G02B 6/506 385/138 |
| 2012/0120963 A1* | 5/2012 | Davis | E21B 33/0355 370/401 |
| 2013/0044983 A1 | 2/2013 | Nagengast et al. | |
| 2013/0046299 A1* | 2/2013 | Newkirk | A61B 18/14 606/41 |
| 2013/0225069 A1* | 8/2013 | Bruce | B63B 21/42 455/40 |
| 2014/0023365 A1 | 1/2014 | Xi | |
| 2014/0093247 A1 | 4/2014 | Jamtveit et al. | |

* cited by examiner

SUBSEA CONNECTOR WITH DATA COLLECTION AND COMMUNICATION SYSTEM AND METHOD

BACKGROUND

1. Field of the Invention

The present invention relates generally to connection of equipment used in subsea operations, such as equipment used in the subsea oil and gas industry as well as telecommunications, to shore-based stations or other remote systems, and is particularly concerned with a subsea electrical, optical, or electro-optical connector unit with a built-in data collection and communication system.

2. Related Art

There are many types of connectors for making electrical and fiber-optic cable connections in hostile or harsh environments, such as underwater or subsea electrical, optical and hybrid electrical and optical connectors which can be repeatedly mated and demated underwater at great ocean depths. The connectors may be electrical only, optical only, or may be hybrid electrical and optical connectors. These connectors typically consist of releasably mateable plug and receptacle units or connector parts, each attached to cables or other devices intended to be joined by the connectors to form completed circuits. Each connector unit contains one or more electrical and/or optical contacts or junctions for engagement with the junctions in the other unit when the two units are mated together. To completely isolate the contacts to be joined from the ambient environment, one or both parts of these connectors house the contacts in oil-filled, pressure-balanced chambers. One example of an electrical underwater pin and socket connector is described in U.S. Pat. No. 5,645,442 of Cairns and is sold by Teledyne ODI, Inc. of Daytona Beach, Fla. under the name Nautilus®.

Monitoring of modern undersea communication and power systems is needed in order to predict faults or diagnose degradation in performance of various system components. Land-based systems exist that can be used to connect a data or power port to verify or measure the presence of data or power at the port, but this data is monitored locally. There is no effective way to monitor subsea installations on an ongoing basis for early detection of potential faults or potential equipment failures.

SUMMARY

Embodiments described herein provide a subsea data collection and communication system installed at a subsea interconnect point or connector unit used for communication between subsea electrical, optical or hybrid electro-optical cables or between a subsea cable and subsea equipment. The data collection and communication system may be built into the subsea connector and is configured to collect system performance data such as voltage, current, optical pressure and the like from the wires or fibers in cables connected to the connector unit, and may also collect data on environmental conditions from sensors installed in or on the connector unit, such as temperature, pressure, sea water salinity, and the like. The collected data is transmitted to a remote monitoring station or local hub for further processing either at periodic intervals or on demand, using bi-directional Ethernet, CANBUS, a carrier frequency system over the cable power lines, optical signal over optical fiber, or optical, acoustical or other wireless communication links over short distances.

According to one aspect, a subsea end connector with an integral data collection and communication module or system is provided which has a first port configured for connection to a first subsea cable and a second port configured for connection to a second cable which may be another subsea cable or jumper cable. The subsea connector includes a single or multi-part outer shell or housing having one or more internal chambers. A data collection and communication system with data input/output ports is installed in an internal chamber of the connector housing or an additional housing or connector unit secured to the connector housing, and communicates with signal carrying media (wires or fibers) of the end connector unit to collect and store monitoring data from signals and power carried on the cable media (wires, fibers, or both), such as internal and external voltage, current, optical pressure, and the like. In one embodiment, the system may include various environmental sensors which may be incorporated inside or outside the connector shell or housing and connected to an input of the data collection and communication system, which also collects and stores environmental data from the sensors such as temperature, water pressure, salinity, and the like. Collected data may be communicated over the cable or cables or by other means to a remote, onshore or offshore monitoring station or a local hub in order to predict faults or diagnose degradation in performance of various system components, and to determine if maintenance is needed.

In one embodiment, the data collection and communication system has one or more first input/output (I/O) ports communicating with one or more signal or power carrying media such as wires or fibers in a first cable connected to the connector unit and one or more second I/O ports communicating with one or more signal or power carrying media such as wires or fibers in a second cable connected to the connector unit, and may also have one or more I/O ports for receiving data from environmental sensors associated with the connector unit. Collected monitoring data may be communicated to a remote monitoring station for processing via the I/O ports to one of the existing cables connected to the end connector unit. Additionally or alternatively, collected data may be communicated via an optical or acoustical transponder for wireless communication over short distances to a nearby platform, an ROV (Remote Operated Vehicle), a submarine, or the like.

This invention provides a subsea "smart" connector with a built-in data collection and communication device or system. This allows easy local monitoring of subsea communication and power systems at one or more subsea connector interfaces in order to predict faults or diagnose degradation in performance of various system components, so that appropriate maintenance can be carried out. The system may include sensors for monitoring local environmental conditions such as temperature, pressure, salinity, and the like with outputs connected to the data collection and communication system for collection, storage, and subsequent communication to a monitoring station.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for a subsea connector or connection point having an integral data gathering and communication system for collecting data on internal functions, environmental conditions, and external system components and communicating the collected data to a shore based monitoring station, a nearby subsea hub, or other monitoring facility.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

Figure 1:
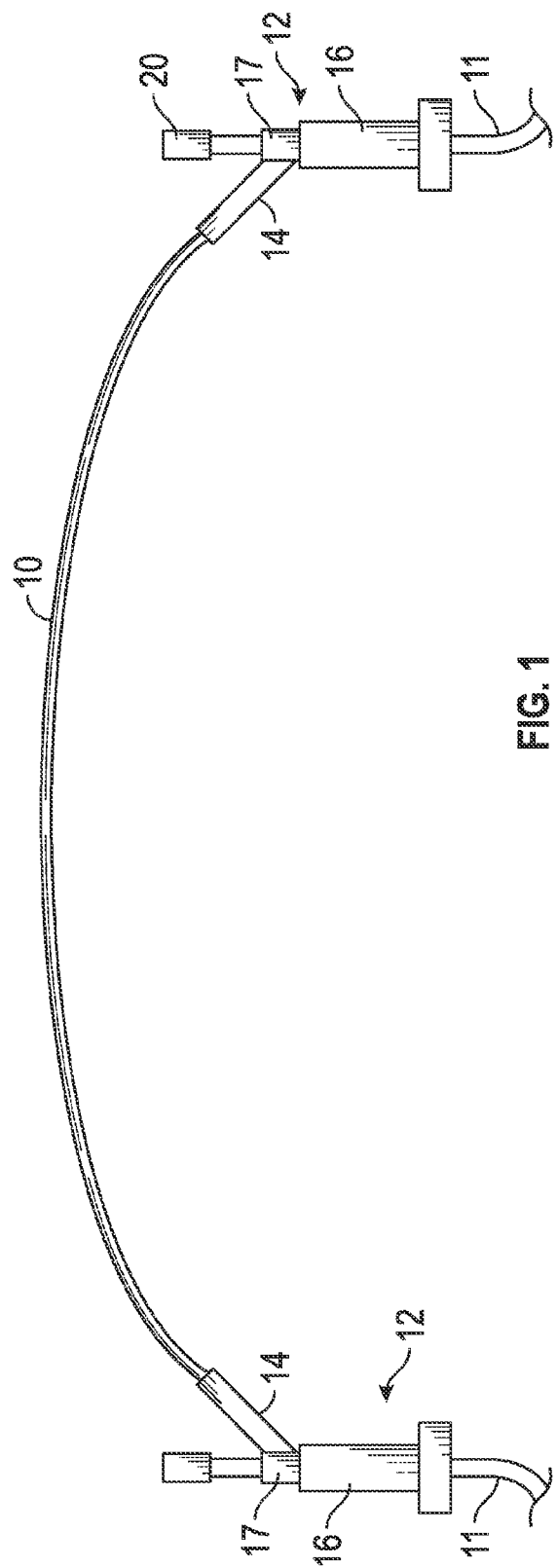
FIG. 1 illustrates one embodiment of a subsea connector system with a jumper cable extending between two end connector units which are also connected to respective subsea cables.
Figure 2:
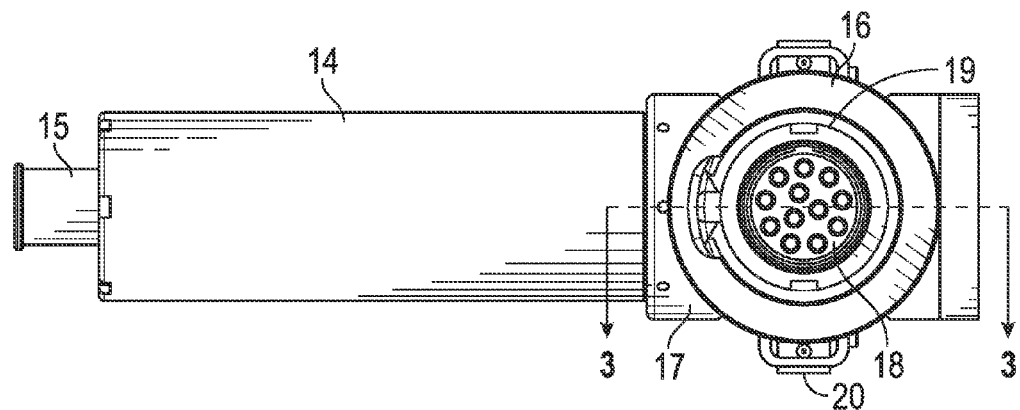
FIG. 2 is a bottom plan view of one of the end connector units of FIG. 1.
Figure 3:
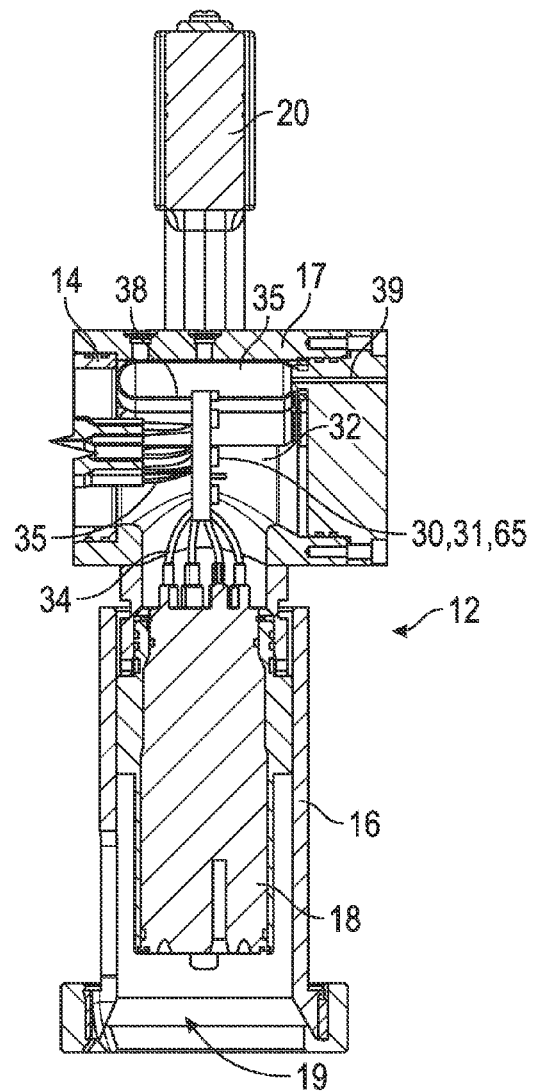
FIG. 3 is a cross sectional view of the termination shell of the cable end connector unit on the lines 3-3 of FIG. 2, illustrating one embodiment of a data collection and communication device mounted inside the shell between signal carrying media of the connector unit and the jumper cable.

FIG. 1 illustrates one embodiment of a subsea communication system including a jumper cable 10 with subsea end connectors or units 12 at each end configured for connection to a mating connector unit at the end of a subsea cable 11, while FIGS. 2 and 3 illustrate one embodiment of an end connector or subsea connector 12 with an integral data collection and communication module or system in more detail. The end connectors may be electrical connectors, optical connectors, or electro-optical connectors and the cables 10, 11 may be electrical Ethernet cables such as 10/100/1000BASE-T cables, optical cables, or electro-optical cables. Each cable has signal carrying media extending between opposite ends of the cable, such as optical fibers or electrical wires, or both fibers and wires, depending on the specific system requirements. The term "signal carrying media" as used herein refers to data and power carrying electrical wires or data carrying optical fibers. Optical or electro-optical Ethernet cables contain one or more Ethernet signal carrying optical fibers, which may be single mode or multi-mode fibers, along with two to four electrical power signal conductor wires (two of which may be redundant), and may comprise pressure balanced, oil-filled hose designed for subsea communications, such as an oil-filled hose or cable manufactured by Teledyne ODI, Inc. of Daytona Beach, Fla. FIGS. 4 to 8 illustrated different embodiments of a data collection and communication system or device 30, 31 and 65 which may be incorporated in a subsea connector or end connector unit or an additional housing attached to a subsea connector at any suitable location, for example at the locations illustrated in the embodiments of FIGS. 2 and 3, 9, 10 and 11, and 12, as described in more detail below.

FIGS. 2 and 3 illustrate one embodiment of the end connector units or subsea connectors 12 in more detail. As best illustrated in FIGS. 2 and 3, in one embodiment each connector unit 12 comprises an outer housing having a first cable connector portion 14 having a cable input port 15 for receiving an end of cable 10, a termination shell 17 connected to connector portion 14, and a second cable connector portion or module 16 which has an open second end 19 and contains a subsea mateable connector unit or module 18 for releasable connection to a mating connector unit (not illustrated) at the end of cable 11. An ROV grip 20 is secured to the housing or shell 16, as seen in FIGS. 1 and 3. Connector unit 18 is not shown in detail in FIGS. 2 and 3 since it may comprise any standard plug or receptacle unit releasably mateable with a mating receptacle or plug unit at the end of an underwater or subsea cable, such as the underwater electrical plug and receptacle connector sold by Teledyne ODI of Daytona Beach, Fla. under the name Nautilus®, or underwater optical or electro-optical plug and receptacles also sold by Teledyne ODI, depending on the type of cable end connector or junction. In this embodiment, connector portion 16 comprises the outer shell or housing of such a plug or receptacle. As is known in the field, contacts of the connector device are connected to one or more sets of signal and power carrying media (fibers or wires) forming signal paths through one or more sealed chambers in the end connector unit to the second cable input/output (I/O) port 15, where they communicate with corresponding signal and power carrying media in cable 10. In the illustrated embodiment, end connector unit 12 is a modified end connector unit with an integral data collection and communication system or module 30, 31 or 65 on a printed wiring board or circuit board mounted in chamber 32 inside termination shell 17, with signal and power carrying media 34 (fibers, electrical wires, or both wires and fibers) extending from housing 16 via a penetrator or feed through (not illustrated) and connected to appropriate circuit input/output (I/O) junctions or ports of module 30, 31 or 65, and corresponding signal and power carrying media 35 from cable 10 extending into chamber 32 and also connected to appropriate circuit I/O junctions of module 30, 31 or 65.

In the embodiment of FIGS. 2 and 3, data collection and communication system or circuit 30, 31 or 65 is enclosed within a chamber 32 inside termination shell 17 which is sealed from the external subsea environment. The components of the data collection and communication system may be mounted on a single layer or multi-layer circuit board mounted on a rigid support platform or the like which may be secured to the reinforced walls of shell 17 in any suitable manner. The shell 17 is of high strength material and construction and is suitable for subsea use, and may be of similar construction to the walls of standard subsea equipment enclosures or housings. In one embodiment, chamber 32 is a hermetically sealed atmospheric chamber which may be a one atmosphere chamber.

Figure 9:
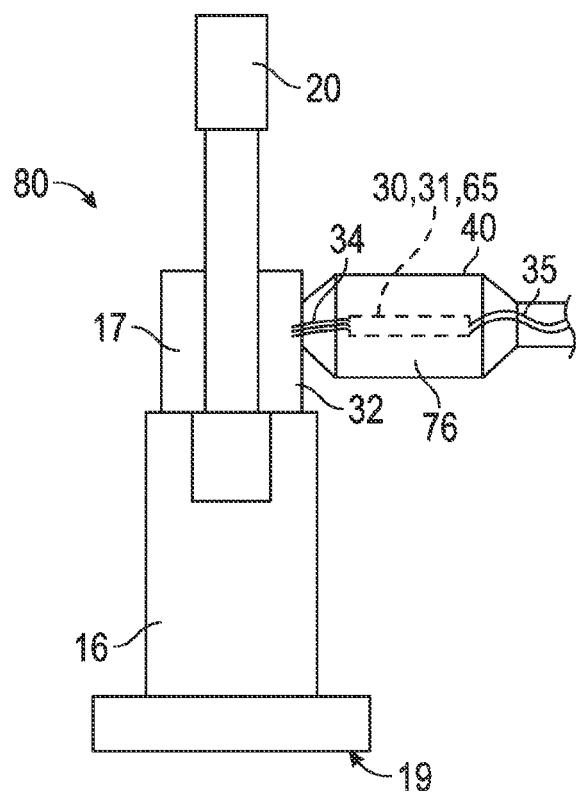
FIG. 9 is a front elevation view of another embodiment of a subsea connector unit with an attached enclosure for containing a data collection and communication device.

Although the data collection and communication system or device 30, 31 or 65 is mounted in a chamber within termination shell 17 in the embodiment of FIGS. 2 and 3 and the modified embodiment of FIGS. 10 and 11, it may alternatively be mounted elsewhere within the connector unit or in an external shell 40 connected to connector unit 12, as described in more detail below in connection with FIG. 9, or in a secondary connector module 86 having an extra inlet/outlet port, as described in more detail below in connection with FIG. 12. In all cases, the system 30, 31, or 65 is housed in a sealed subsea enclosure.

As discussed in more detail below in connection with FIGS. 4 to 8, the data collection and communication system or device is configured to detect and store both internal and external source operational status data (e.g. voltage, current, optical power and the like) from the incoming media via cables 11 and 10, and may also be configured to collect data from local sensors regarding current environmental conditions. Although all signal and power carrying media are routed to the data collection and communication system in the illustrated embodiment, only selected wires and/or fibers may be routed through system or circuit 30, 31 or 65 in alternative embodiments. The collected system status and environmental conditions data is stored and subsequently transmitted to a remote land-based or offshore monitoring station or to a local hub for further processing either at periodic intervals or on demand, using bi-directional Ethernet, CANBUS, a carrier frequency system over the cable power lines, optical signal over optical fiber, or wireless communication links over short distances.

Figure 4:
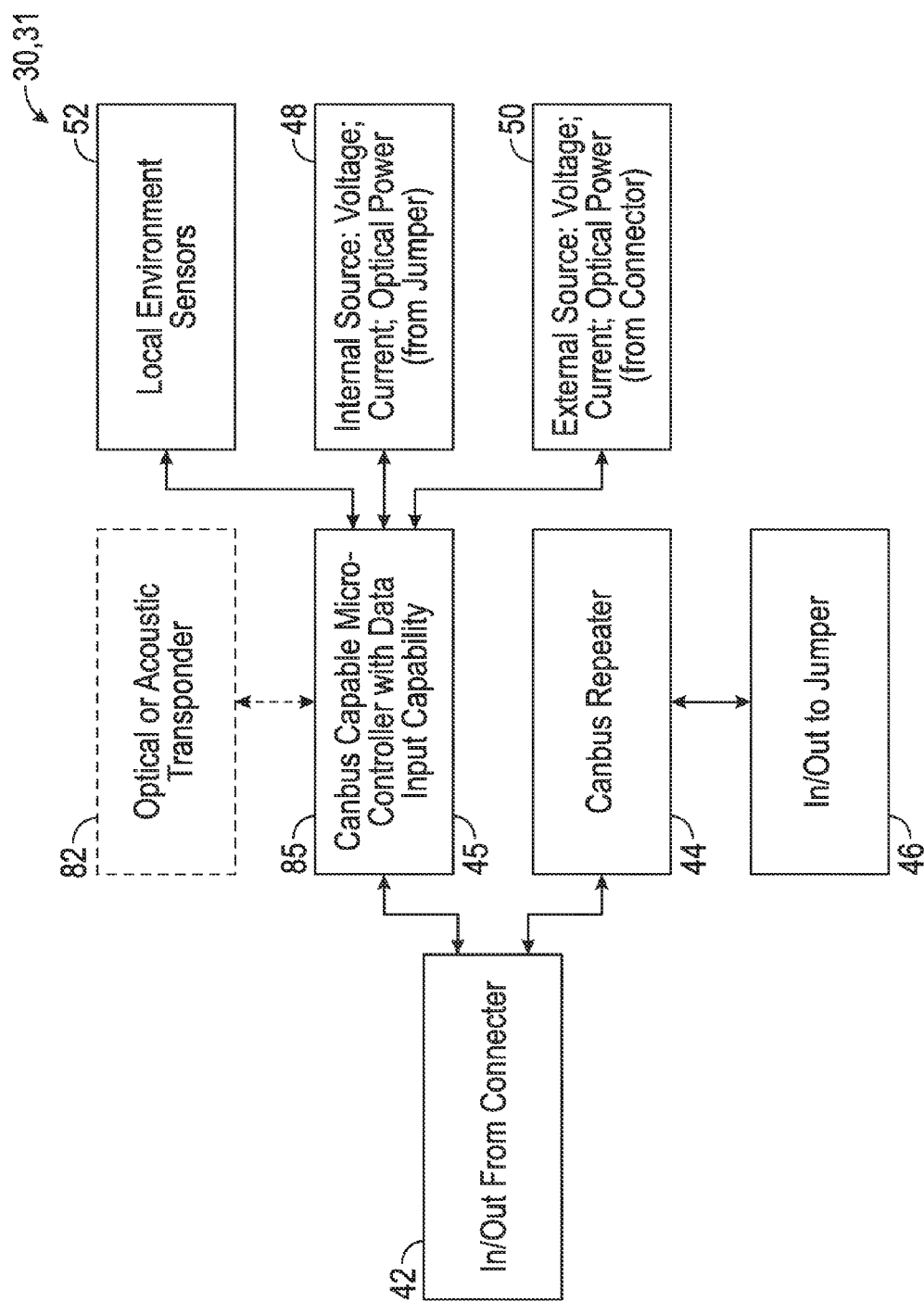
FIG. 4 is a functional block diagram of one embodiment of a CANBUS implementation of the data collection and communication device of FIG. 3.

FIG. 4 illustrates one embodiment of a CANBUS implementation of data collection and communication module 30 into a CANBUS repeater system. In one embodiment, the incoming media 34 from cable 11 via connector 16, whether optical fibers, electrical wiring, or both, are connected to a first input/output (I/O) port 42 which has a bi-directional communication path via CANBUS with a CANBUS repeater 44 and a CANBUS capable microcontroller or microprocessor 45 which has data input capability. Media 35 in communication with cable 10 are connected to a second input/output (I/O) port 46 which communicates with CANBUS repeater 44 via a bi-directional CANBUS link. Thus, signals and power are communicated between the media in cables 10 and 11, while microprocessor 45 collects and stores system performance data which it acquires from the signal and power carrying media on cables 10 and 11 according to programmed instructions, such as internal source voltage, current and optical power 48 via jumper cable 10 and external source voltage, current and optical power 50 via cable 11.

In one embodiment, where the cables are fiber optic or hybrid electro-optical cables, the subsea optical CAN bus system described in U.S. Pat. App. Pub. No. 20140023365 may be used for conversion of electrical signals to optical signals carried along the optical or electro-optical jumper cable and vice versa, and the contents of U.S. Pat. App. Pub. No. 20140023365 are incorporated herein by reference in their entirety. In this alternative, it will be understood that the data collection and communication system 30, 31 or 65 has separate electrical and optical data input/output ports for communication with electrical wires and optical fibers of the optical or electro-optical cable or cables.

Figure 7:
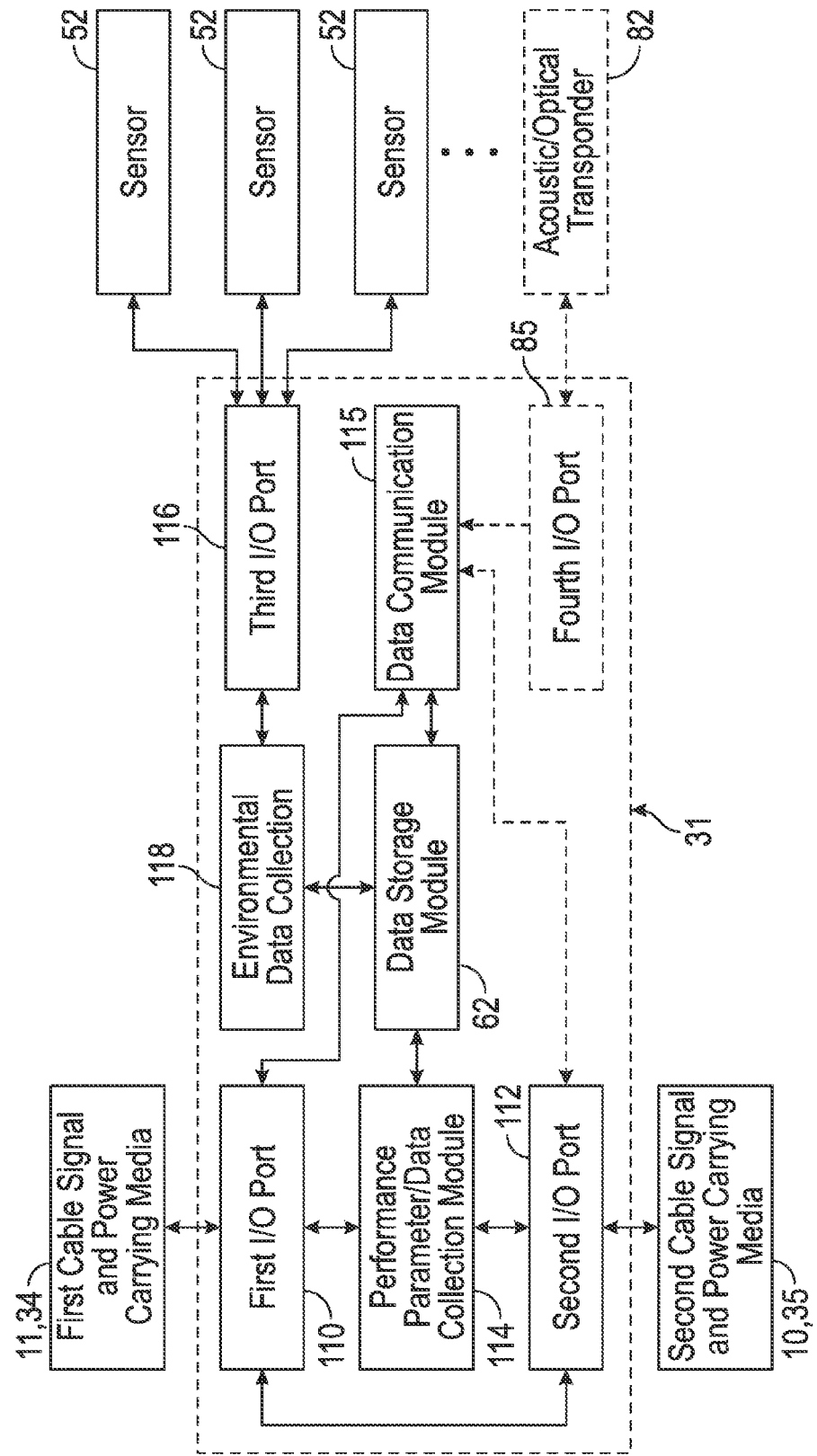
FIG. 7 is a block diagram similar to FIG. 6 illustrating another embodiment of a data collection and communication device or system which includes environmental sensors and collection of environmental sensor data in addition to internal function and externally generated data.

In one embodiment, connector unit 12 is also modified to include various environmental sensors 52, such as temperature sensors, pressure sensors, salinity sensors, and the like. Some sensors may be mounted on the exterior of the shell 16 or 17 to detect external environmental conditions, while one or more sensors may also be provided inside the connector housing if desired. The sensor outputs are suitably connected to associated data inputs of microprocessor 45 as schematically illustrated in FIGS. 4 and 7.

Figure 5:
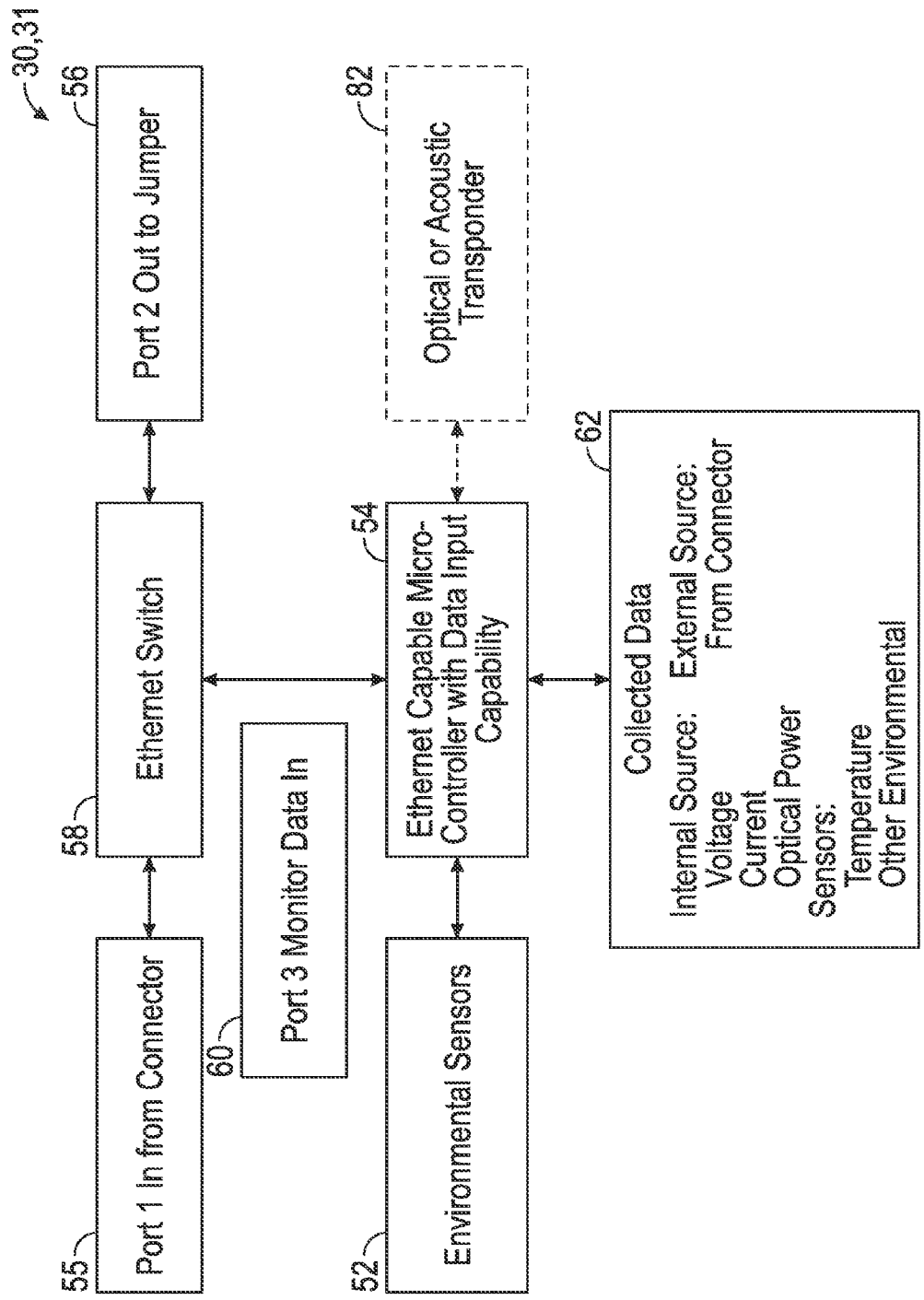
FIG. 5 is a functional block diagram illustrating one embodiment of an Ethernet implementation of the data collection and communication device.

FIG. 5 illustrates a second embodiment of the data collection and communication device or system 30 or 31 in which data collection and communication capability is incorporated into an Ethernet capable microcontroller 54. In this embodiment, a first I/O port 55 is in communication with media 34 extending from connector shell 16, and a second I/O port 56 is in communication with media 35 connected from jumper cable 10 for signal communication between cables 11 and 10. Port 55 communicates with port 56 via Ethernet switch 58. A third I/O port 60 communicates with Ethernet switch 58 for input of monitoring data via the Ethernet switch 58 to microcontroller 54. Data collected from environmental sensors 52 is also communicated to microcontroller 54 via respective sensor inputs or via port 60. The collected data is stored in a suitable data storage module 62 and periodically communicated to a remote monitoring station via Ethernet switch 58 and cable 11, and/or to a local hub via acoustic or optical transponder 82, either at fixed intervals or on demand.

In both the CANBUS and Ethernet systems described above, collected monitoring data is saved in a data storage module 62 and may be transmitted to a remote on shore or off shore monitoring station or a local hub via the communications channel in the respective cable, either at predetermined intervals or on receipt of a data request from the monitoring station, and may also be transmitted to a local hub, ROV, submarine or the like via transponder 82. The collected data is then processed to diagnose faults and determine whether maintenance is needed. The communication of collected data may be via Ethernet, CANBUS, carrier frequency over cable power lines, optical signal over optical fiber, or the like.

Figure 6:
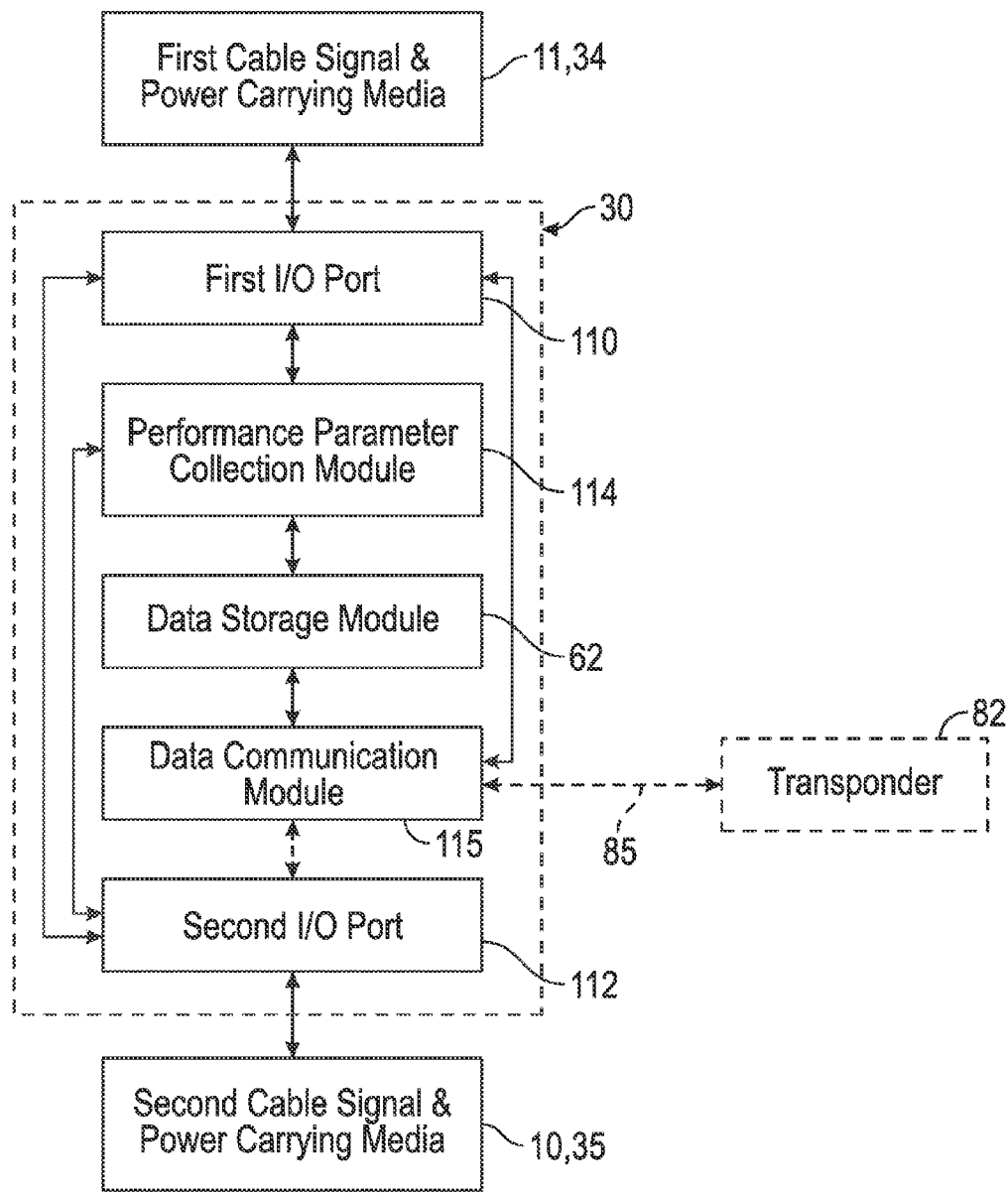
FIG. 6 is a more detailed block diagram of one embodiment of a data collection and communication device or system.

FIG. 6 is a block diagram illustrating one embodiment of the data collection and communication system or device 30 in more detail. In this embodiment, system 30 collects operational status data from the external source via signal and power carrying media in cable 11 and internal or local source data via signal and power carrying media in jumper cable 10. FIG. 7 is a block diagram illustrating another embodiment of a data collection and communication system or device 31 which is configured to collect system operational data carried by the cables and also to collect sensor data from local environmental sensors.

As illustrated in FIG. 6, the system or device 30 has a first I/O port 110 which communicates with signal and power carrying media (wires or fibers, or both) in cable 11 and a second I/O port 112 which communicates with signal and power carrying media (wires or fibers, or both) in cable 10.

For electro-optical cables and optical cables with one or more electrical power carrying wires, separate electrical and optical I/O ports are provided. A performance parameter collection module 114 measures performance related data from the signals carried by the media, such as voltage, current, and/or optical pressure, and communicates the measured operating or performance parameters to data storage module 62. A data communication module 115 is configured to transmit the stored performance parameters periodically or on demand to a system performance monitoring station, for example via the first cable 11 to a remote monitoring station which may be land-based, and/or via second cable 10 to a local hub. In FIG. 6, modules 114, 62 and 115 may be provided by CANBUS capable microcontroller 45 of FIG. 4 or Ethernet capable microcontroller 54 of FIG. 5, depending on whether the system is using a CANBUS or Ethernet arrangement for signal communication. Additionally, system performance data may be transmitted via port 85 for wireless communication via transponder 82, which may be mounted on the subsea connector shell, as described in more detail below in connection with the embodiment of FIGS. 10 and 11.

FIG. 7 illustrates a modified data collection and communication system 31 which adds a third I/O port 116 which communicates with one, two or more environmental sensors 52 mounted on or within the subsea connector 12 and is connected to environmental data collection module 118. Sensors 52 may include a water temperature sensor, a water pressure sensor, a salinity sensor, or the like. Sensors may also be provided for monitoring pressure and temperature within the connector chamber or chambers. Environmental data collection module 118 receives sensor input signals and communicates the sensor data to the data storage module 62 for communication to the monitoring station together with the performance parameter data collected by module 114. System 31 is otherwise identical to that of FIG. 6, and like reference numbers are used for like parts as appropriate. Although modules 114 and 118 are shown separately in FIG. 7, they may be embodied as a single module in alternative embodiments. Additionally, as in FIG. 6, modules 114, 118, 62 and 115 may be incorporated in either CANBUS capable microcontroller 45 of FIG. 4 or Ethernet capable microcontroller 54 of FIG. 5. As illustrated in FIG. 7, an optional additional or fourth input/output port 85 is provided for wireless communication with a local monitoring station such as a local hub or ROV via transponder 82, which may be an acoustical or optical transponder or other type of transponder, as also illustrated in FIG. 7.

Although the various I/O ports in the systems of FIGS. 4 to 7 are shown as single I/O junctions, it will be understood that each port may comprise two or more junctions, depending on the number of separate signal/power configuring wires or fibers are involved.

Figure 8:
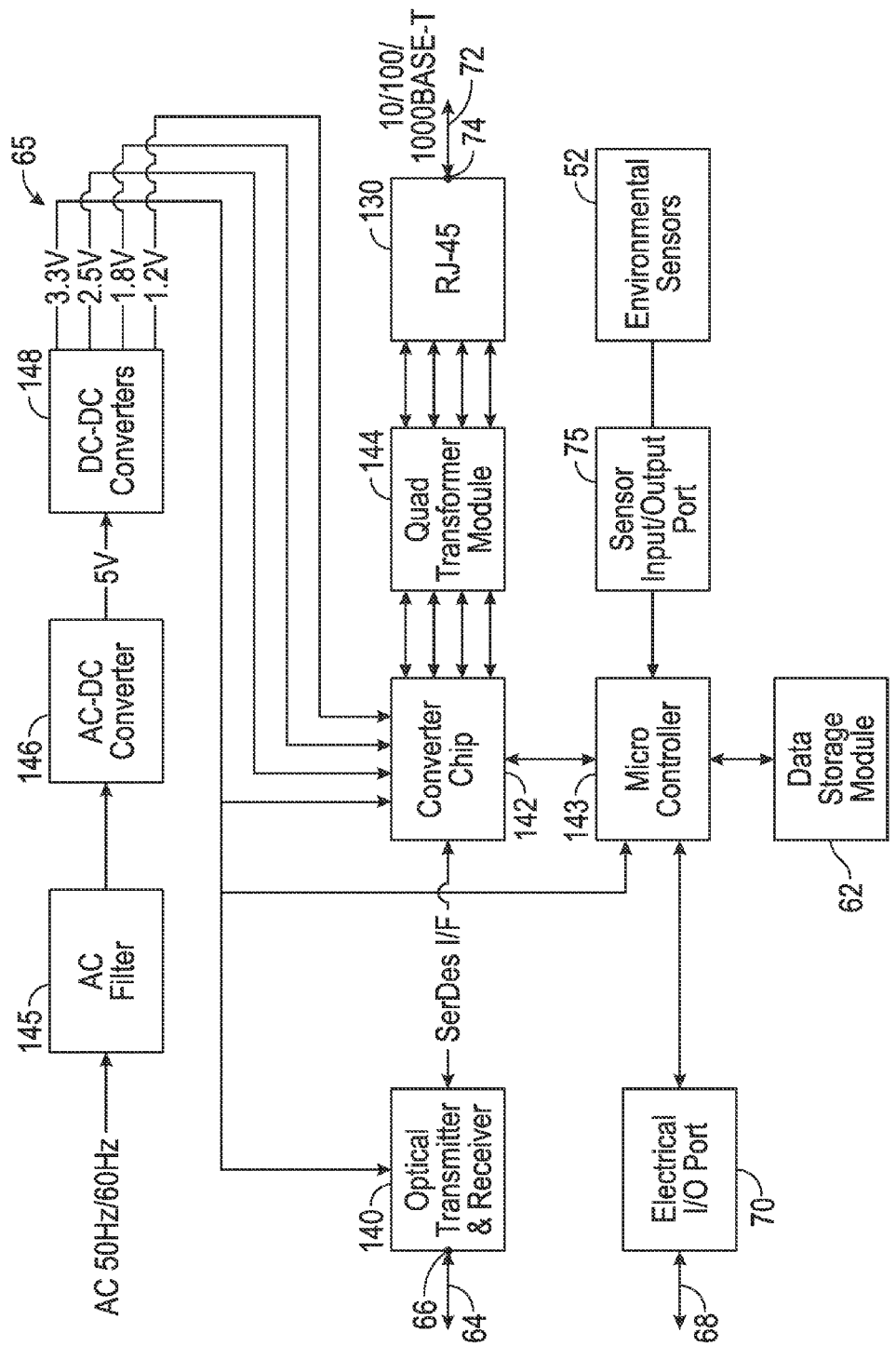
FIG. 8 is a functional block diagram of an embodiment of a data collecting and communication device incorporated in a connector signal communication circuit including an electro-optical media converter.

FIG. 8 illustrates another embodiment of a circuit 65 including a data collection and communication system which may be built into a subsea connector or connector unit 12 in a similar manner to the systems 30 and 31 described above. In this embodiment, the subsea connector is designed for bi-directional communication between subsea optical cables and electrical Ethernet cable 11, for example as described in US Pat. App. Pub. No. 2013/0044983 referenced above, the contents of which are incorporated herein by reference. The connector unit of US Pat. App. Pub. 2013/0044984 includes a built-in, bi-directional optical/electrical media converter on a PWB (printed wiring board) for converting signals from the electrical cable into optical signals and vice versa. The existing PWB of such connector units may be modified to provide for data collection and storage of information extracted from the optical and electrical media as well as environmental sensor data, and subsequent communication of the collected monitoring data to a remote monitoring station or local hub for processing. FIG. 8 illustrates one embodiment of a modified optical/electrical media converter circuit 65 which may be installed at an appropriate location inside the connector or termination shell or in a suitable chamber inside the connector unit, for example as described in US Pat. App. Pub. No. 2013/0044983. As illustrated in FIG. 8, single mode or multi-mode optical fiber or fibers 64 from cable 10 entering chamber 32 from an optical cable termination assembly are routed to an optical input/output (I/O) junction 66 of circuit 65, while electrical power wires 68 of optical cable 10 are routed to electrical I/O junction or port 70 which is connected to data and power inputs of microcontroller 143. Electrical signal and power wires 72 from cable 11 extend to the second electrical I/O junction 74 of the media converter and data collection and communication circuit 65. Outputs of any environmental sensors 52 installed inside or outside the connector unit 12 are connected to sensor data input/output port 75 of microprocessor 143. Collected system and environmental monitoring data is stored in data storage module 62.

Circuit 65 converts electrical signals received at electrical I/O port or junction 74 of circuit 65 into optical signals transmitted at optical I/O port or junction 66, and converts optical signals received at I/O port 66 into electrical signals at I/O port 74. At the same time, electrical signals received at port 74 are provided to data inputs of microcontroller 143, and electrical signals converted from optical signals received at port 66 are also provided by O-E converter chip 142 to data inputs of microprocessor 143, as are electrical power inputs from the electrical input/output port 70 associated with cable 10. Although ports or junctions 66, 70, 74, and 75 are shown as single I/O junctions, it will be understood that two or more electrical I/O junctions and optical I/O junctions are provided in some embodiments, depending on the number of separate signal carrying wires and fibers and the number of separate sensor inputs. In one embodiment, a controller area network (CAN) bus arrangement may be used for signal communications in circuit 65.

The circuit 65 basically comprises an optical transmitter and receiver 140 connected to the optical input/output port or junction 66, a bi-directional optical/electrical converter module or chip 142, and a microcontroller 143 which controls operation of the converter module 142 as well as collection and communication of data collected from the cable optical and electrical media and from the environmental sensors. Separate microcontrollers or microprocessors for the two functions may be provided in alternative embodiments. Quad transformer module 144 is connected to electrical input/output device 130, which may be an RJ-45 connector in one embodiment. An AC power supply (not illustrated) is connected to AC filter 145 which is followed by AC-DC converter 146, and DC-DC converters 148 for the precise voltages needed by the module components, specifically the optical transmitter and receiver 140, the converter chip 142, and the microprocessor or microcontroller 143. AC filter 145 and AC-DC converter 146 are omitted where the power supply is a DC supply voltage. Power supply for circuit 65 may alternatively be provided by power carrying wires of either the electrical or optical cables connected to the unit, and in this case the power carrying wires are connected to DC-DC converter 148.

The data collection and communication device or system of FIGS. 4 to 7, or the modified media converter and data collection and communication circuit or system of FIG. 8, may be suitably mounted on a printed wiring board inside the existing connector or termination shell as illustrated in FIG. 3. Alternatively, the printed wiring board carrying the data collection and communication system 30 or 31 or combined media converter and data collection and communication system 65 may be mounted in a chamber 76 inside an external, add-on housing or shell 40, as illustrated in FIG. 9. In FIG. 9, modified subsea connector 80 includes an additional shell 40 connected to the termination shell 17 between the shell output/input and cable 10. Chamber 76 of shell 40 communicates with chamber 32 of shell 17 to provide more room for implementation of the various functions of the collection and communication module as well as any other functions to be included (such as the media converter of FIG. 8). The subsea connector 80 is otherwise identical to connector 12 of FIGS. 1-3, and like reference numbers are used for like parts as appropriate.

Figure 10:
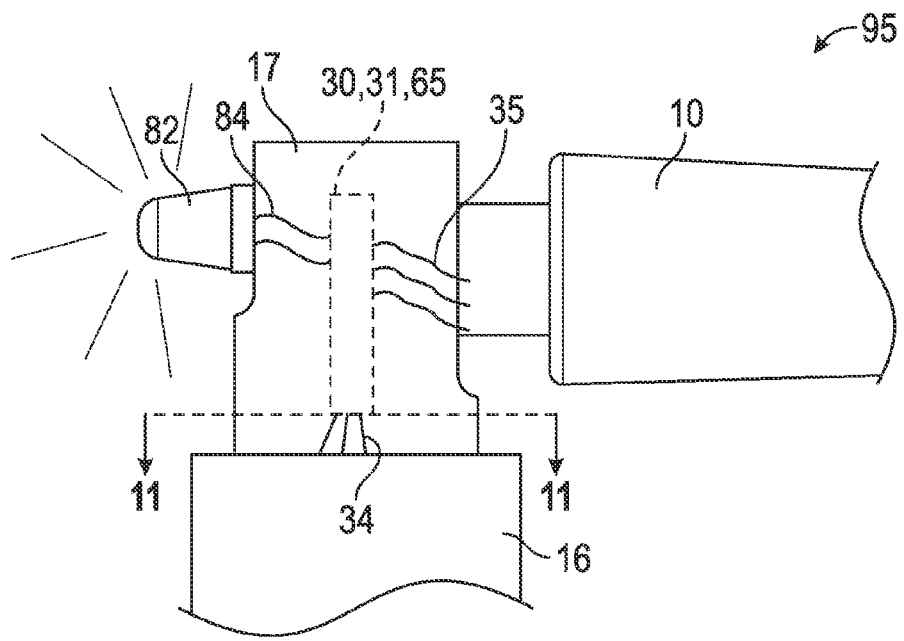
FIG. 10 is a front elevation view illustrating a modified termination shell of a subsea end connector unit incorporating a transponder for wireless communication connected to a data collection and communication device or circuit board inside the shell.
Figure 11:
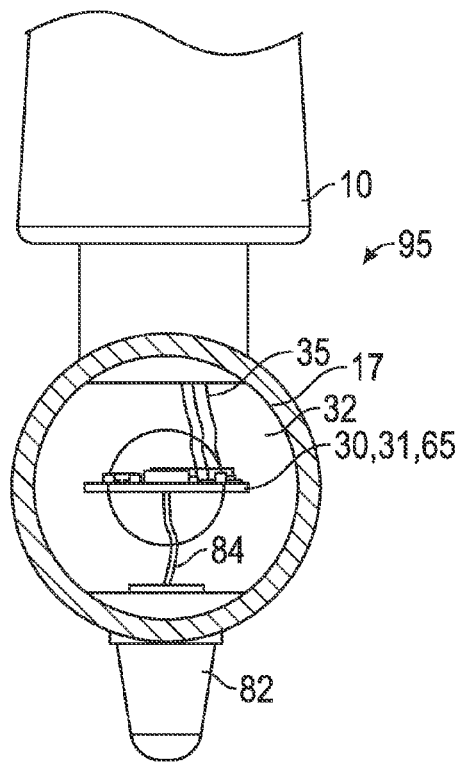
FIG. 11 is a cross-section of the termination shell of FIG. 10 on the lines 11-11 of FIG. 10, illustrating the circuit board and signal path from the transponder to the circuit board in more detail.

FIGS. 10 and 11 illustrate part of a modified connector unit 95 in which a transponder 82 such as an acoustic or optical transponder or hydrophone is mounted on the outside of termination shell 17 with signal wires 84 extending from the transponder into chamber 32 and connected to a transponder I/O port 85 of module 30, 31 or 65 for bi-directional communication between the microprocessor 45 and a local monitoring station such as a nearby hub or a remotely operated vehicle (ROV) or submarine. Connector unit 95 is otherwise identical to the connector unit of FIGS. 1 to 3, and like reference numbers are used for like parts as appropriate. A similar transponder I/O port may be provided in the Ethernet implemented system or circuit of any of FIG. 4 to FIG. 8, as illustrated in dotted outline in FIGS. 4 to 7. Transponder 82 may be used for wireless communication (acoustic or optical communication or the like) over a short distance to a nearby platform, ROV, or submarine for two-way communication of system operational data or commands. Inductive coupling or radio links may alternatively be used over very short distances.

Figure 12:
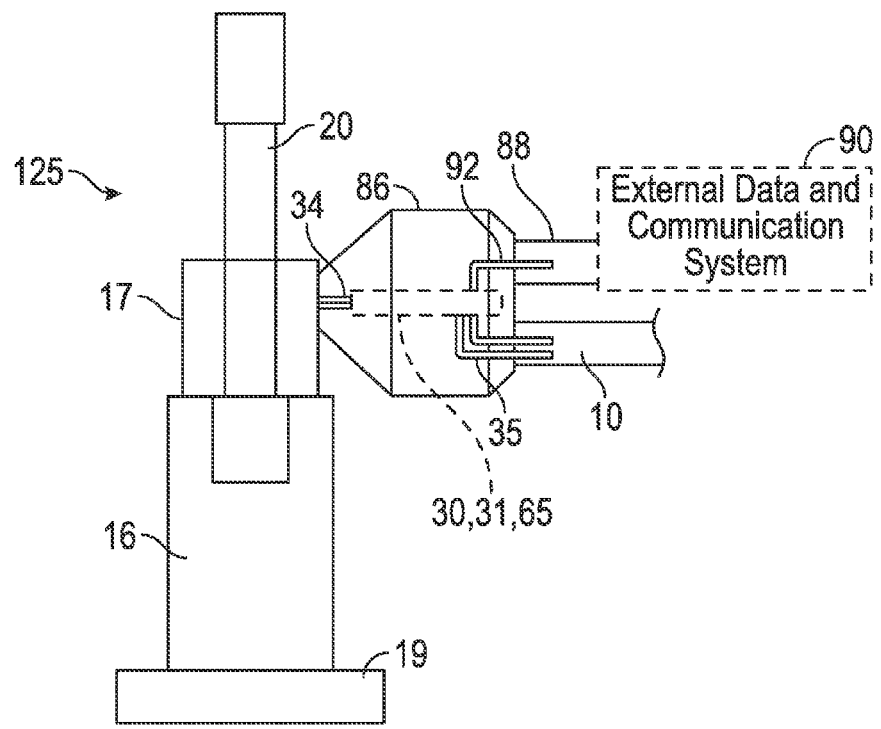
FIG. 12 is a front elevation view of another embodiment of an end connector unit with a secondary connector containing a data collection and communication device or circuit and providing an extra data port or umbilical for an external instrument or data and communication system.

In the alternative embodiment of FIG. 12, modified connector unit 125 is equipped with a "piggy-back" connector unit 86 with a first input/output connection or port connected to cable 10 and a second input/output connector 88 for dry mate or wet mate connection to a local, external instrument or external data and communication system 90. In this case, the function of the end connector unit 12 is expanded to have it serve as a communication access point and node. In one embodiment, the external data and communication system may be secured to piggy-back connector unit via mateable dry mate connector portions or a feed through connector on the external system or equipment module 90 prior to subsea deployment of the connector unit. As illustrated in FIG. 12, data collection and communication system 30, 31 or 65 is mounted in an inner chamber of connector unit 86 with signal and power carrying media 34 extending out of termination shell 17 connected to an input/output port or ports of the data collection and communication system, and corresponding signal and power carrying media 35 extending from cable 10 to a second input/output port of system 30, 31 or 65. Data collected from the media 34 and 35, and from any sensors (not illustrated) is communicated by media 92 to I/O connector 88 for communication with the external data and communication system 90.

The connector unit 12, 80, 95 or 125 in the foregoing embodiments may be provided at one end of cable 10 only, while the other end is terminated to a standard subsea optical connector or electro-optical hybrid connector or feed through fitting of a local subsea equipment housing. Although the electrical cable connector portion 16 and termination shell 17 are shown separately in FIGS. 1 to 3, they may be formed as a single or unitary housing in alternative embodiments. Additionally, all three portions 14, 17 and 16 may also be formed in a unitary housing in other embodiments, and the data collection and communication module or PWB may be mounted in that housing or an additional connector shell or housing connected to the main connector housing.

Electrical connecter module 18 may be similar or identical to a standard subsea or wet mateable electrical plug or receptacle connector unit or module, for example a plug or receptacle connector unit as described in U.S. Pat. No. 5,645,442 or U.S. Pat. No. 5,171,158 of Cairns, or in U.S. Patent Application Publication No. 2011/0130024 of Cairns, the contents of each of which are incorporated herein by reference, or other such subsea electrical connector units. Alternatively, connector module 18 may be a standard subsea or wet mateable optical or electro-optical plug or receptacle connector unit, as described in U.S. Pat. No. 6,315,461 of Cairns, U.S. Pat. No. 6,017,227 of Cairns et al., U.S. Pat. No. 6,332,787 of Barlow et al., and others, and the contents of each of the aforementioned patents are also incorporated herein by reference. Connector unit 18 is therefore designed for releasable connection to a mating, standard electrical, optical, or electro-optical receptacle or plug connector unit at the end of cable 11.

The number of electrical wires and/or optical fibers in cables connected to connector unit 18 may vary from two to twelve or more, depending on the application. Typically, one, two, or more electrical power carrying wires are included, with the remaining media carrying signals.

The above embodiments implement monitoring of modern undersea communication and power systems at interconnect points or connections in such systems, to allow faults to be predicted or degradations in performance to be predicted on an ongoing basis, both to assure the validity of the connection and the function of a unit to which the connection is made. The addition of a data collection and communication module to gather such performance data and store the data for later communication to a remotely located or local system monitoring station converts the conventional subsea connector or subsea junction to a "smart" connector, potentially avoiding the need to send an ROV or the like to check such junctions and implement repairs after the fact, i.e. when a system failure has already occurred. The embodiments described above incorporate monitoring of both external and internal functions at the interconnect point, and optionally also incorporate monitoring of local environmental conditions, with collected data communication to a shore-based station or a nearby hub for fault prediction or performance degradation. This allows for remote or local monitoring of the system at one or more connector interfaces, and is beneficial for maintaining asset integrity or planning maintenance activity. There are many possible means for communication of the collected monitoring data to a monitoring station, for example Ethernet, CANBUS, or some carrier frequency system over power lines, as well as an optical or acoustic transponder for local signal communication, or inductive coupling or radio links over very short distances.

In the past, an ROV was necessary in order to check the presence of data or power on a one time basis at an interconnect point in a subsea system. In the foregoing embodiments, the presence of data and power as well as the local environmental conditions can be monitored remotely as well as locally on an ongoing basis.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps and modules described in connection with the embodiments disclosed herein can be implemented or performed with a processor, such as a general purpose processor, a multi-core processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described a transmitting data to (or receiving from) a second device when there are intermediary devices that couple the first and second device and also when the first device is unaware of the ultimate destination of the data.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

We claim:

1. A subsea connector, comprising:
a single or multi-part connector housing having a first cable inlet port configured for selected connection to the end of a first, subsea cable and a second port configured for connection to a second cable;
first signal carrying media extending from the first cable inlet port into the connector housing for communication with second signal carrying media in the second cable via the second port;
a data collection and communication system located in the connector housing and configured to collect and store one or more predetermined performance parameters of the signals carried by said first and second signal carrying media, the system having a first input/output port communicating with at least some of the signal carrying media extending from the first cable inlet port, a second input/output port communicating with at least some of the signal carrying media in the second cable, and a microprocessor connected to said first and second input/output ports, the microprocessor comprising a data collection module configured for detecting and collecting predetermined parameters of the signals, a data storage module configured for storing said predetermined performance parameters, and a data communication module configured for communicating said stored performance parameters to a monitoring station; and
a transponder externally mounted on said connector housing, the data communication module having a third input/output port communicatively connected to said transponder and configured for wireless communication with a local monitoring device in the vicinity of said connector housing for receiving commands from said local monitoring device and sending collected system performance parameters to said local monitoring device.

2. The subsea connector of claim 1, wherein the data communication module is communicatively connected to at least one of said cable input/output ports for communicating stored performance parameters to said monitoring station via signal carrying media of said first or second cable.

3. The subsea connector claim 1, further comprising at least one sensor for monitoring a selected environmental parameter inside or outside the connector housing, the sensor having an output in communication with said data collection and communication system.

4. The subsea connector of claim 3, comprising a plurality of sensors associated with said connector housing for monitoring different external or internal environmental parameters, the sensors having outputs and the data collection and communication system further comprising an environmental data collection module communicating with said sensor outputs and providing collected sensor output data to said data storage module, said data communication module being further configured to communicate stored environmental data to said monitoring station.

5. The subsea connector of claim 4, wherein said sensors comprise at least a subsea temperature sensor and a subsea pressure sensor.

6. The subsea connector of claim 1, wherein said at least one or more predetermined performance parameters comprises a plurality of performance parameters selected from the group consisting of voltage, current and optical pressure.

7. The subsea connector of claim 1, wherein said connector housing comprises at least a first housing portion containing a subsea mateable receptacle or plug unit for releasable connection to a mating plug or receptacle unit at the end of the first subsea cable, and a termination shell connected between said first housing portion and said second port, and the data collection and communication module is mounted in said termination shell.

8. The subsea connector of claim 1, wherein said connector housing comprises a first housing portion containing a subsea mateable receptacle or plug unit for releasable connection to a mating plug or receptacle unit at the end of the first subsea cable via said first input, a termination shell connected to said first housing portion, and an additional external shell connected between the termination shell and the second cable, and the data collection and communication module is mounted in said external shell.

9. The subsea connector of claim 1, wherein said connector housing has at least a first connector housing and a second connector housing between said first and second cables, the second connector housing includes said second port and a third port configured for connection to an external data and communication system, said data collection and communication module is mounted in said second connector housing, performance parameter data carrying media extend from said data communication module to said third port, and said second signal carrying media extend from said second input/output port of said data collection and communication module to said second port of the second connector housing.

10. The subsea connector of claim 9, wherein said third port comprises a dry mate or wet mate connector.

11. The subsea connector of claim 1, wherein said signal carrying media comprise both data signal and power carrying media.

12. The subsea connector of claim 1, wherein the first signal carrying media comprise one or more electrical conductors, and the second signal carrying media comprise one or more electrical conductors.

13. The subsea connector of claim 1, wherein the first signal carrying media comprise one or more optical fibers, the second signal carrying media comprises one or more optical fibers, and the data collection and communication system is configured to pass the signals between said first and second input/output ports using a controller area network (CAN) bus protocol.

14. The subsea connector of claim 1, wherein the data collection and communication system is configured to pass the signals between the first and second input/output ports using at least one of Modbus protocol, RS-232 standard, and RS-485 standard.

15. The subsea connector of claim 1, wherein the first signal carrying media comprise one or more electrical conductors, at least some of the second signal carrying media comprise optical fibers, and the data collection and communication system further comprises a converter module configured to convert optical signals traveling on the optical fibers to/from electrical signals traveling on the electrical conductors.

16. The subsea connector of claim 1, wherein the data collection and communication system is further configured to perform at least one function of switching, repeating, formatting, and multiplexing of data signals.

* * * * *